United States Patent [19]
Förster

[11] Patent Number: 5,315,958
[45] Date of Patent: May 31, 1994

[54] METHOD AND DEVICE FOR SUPPLYING ANIMAL FEED INTO A FEED TROUGH

[76] Inventor: Martin Förster, Gerwigstrasse 27, D-7707 Engen, Fed. Rep. of Germany

[21] Appl. No.: 989,063

[22] Filed: Dec. 11, 1992

[30] Foreign Application Priority Data

Dec. 15, 1991 [DE] Fed. Rep. of Germany ....... 4141347

[51] Int. Cl.$^5$ .............................................. A01K 5/00
[52] U.S. Cl. ........................................................ 119/54
[58] Field of Search .................... 119/54, 51.02, 56.1, 119/51.12, 51.5, 52.1, 53.5, 57.92, 55

[56] References Cited

U.S. PATENT DOCUMENTS

| | | | |
|---|---|---|---|
| 3,536,046 | 10/1970 | Lippi | 119/56.1 |
| 4,162,683 | 7/1979 | Brooks | 119/51.02 |
| 4,361,117 | 11/1982 | Tohme | |
| 4,508,061 | 4/1985 | Swearingin | |
| 4,735,171 | 4/1988 | Essex | 119/51.12 |

FOREIGN PATENT DOCUMENTS

| | | | |
|---|---|---|---|
| 0029278 | 8/1986 | European Pat. Off. | |
| 395179 | 10/1990 | European Pat. Off. | 119/54 |
| 1802194 | 10/1968 | Fed. Rep. of Germany | |
| 2018987 | 4/1970 | Fed. Rep. of Germany | |
| 802422 | 10/1958 | United Kingdom | |

OTHER PUBLICATIONS

Landtechnik vol. 43, No. 5, p. 230, 1988.

Primary Examiner—Gene Mancene
Assistant Examiner—Thomas Price
Attorney, Agent, or Firm—Robert W. Becker & Associates

[57] ABSTRACT

A device for the controlled supply of animal feed includes a supply container, a feed trough with a side wall having an inlet, a conveying device with a drive unit connected between the supply container and the inlet of the feed trough, whereby the conveying device has an outlet opening that is coaxially arranged relative to the axis of the conveying device and the outlet opening is directly connected to the inlet of the feed trough. A control unit is connected to the drive unit for switching on and off the drive unit. A control flap is pivotably connected above the inlet and includes a control element that is connected to the control unit. The control flap activates the control unit for switching on and off the drive unit depending on the amount of animal feed present in the feed trough behind the control flap or due to activation by an animal to be fed. This device ensures that an animal to be fed only receives its allotted amount of animal feed because only after emptying the feed trough a new feed distribution is possible.

37 Claims, 4 Drawing Sheets

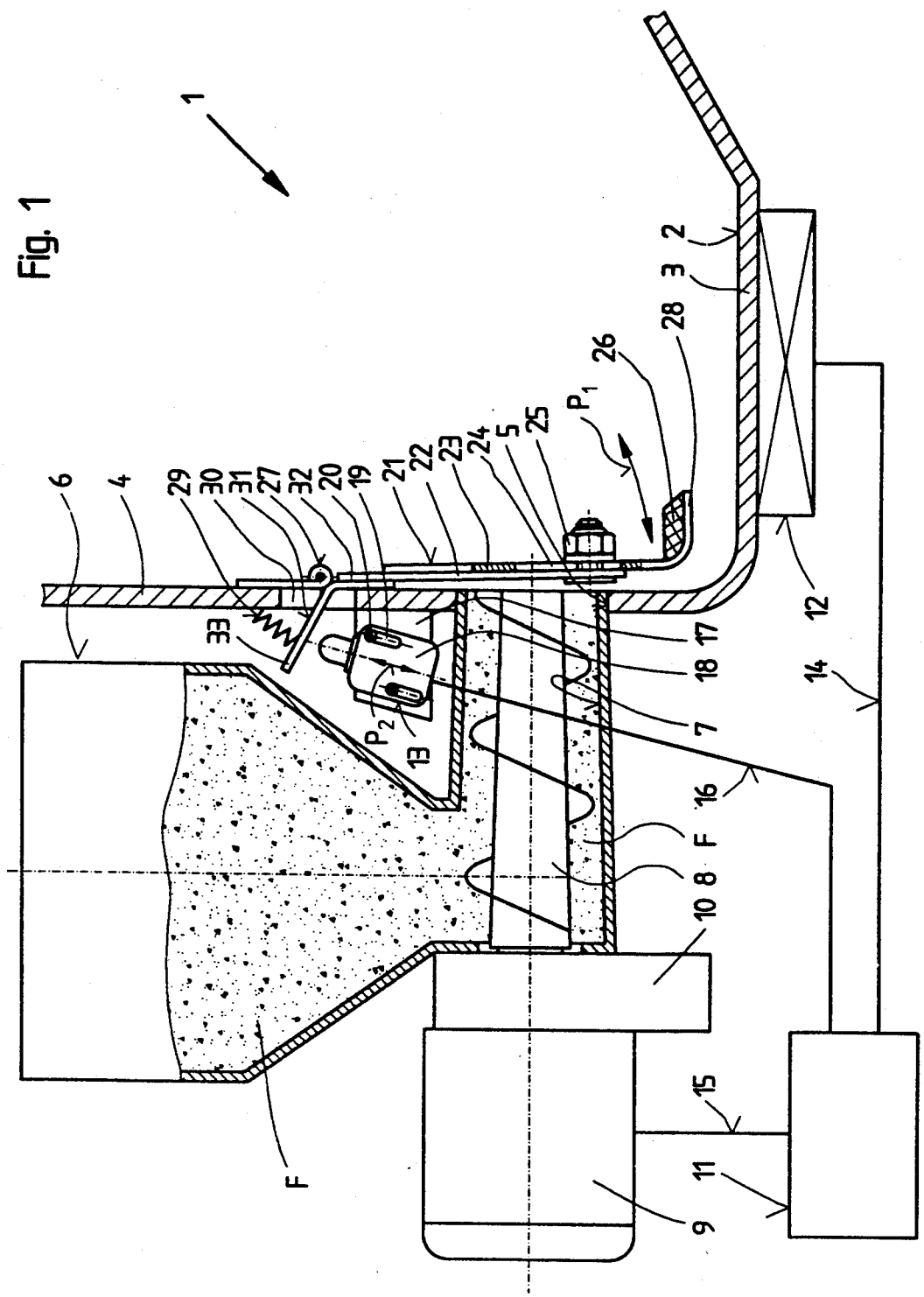

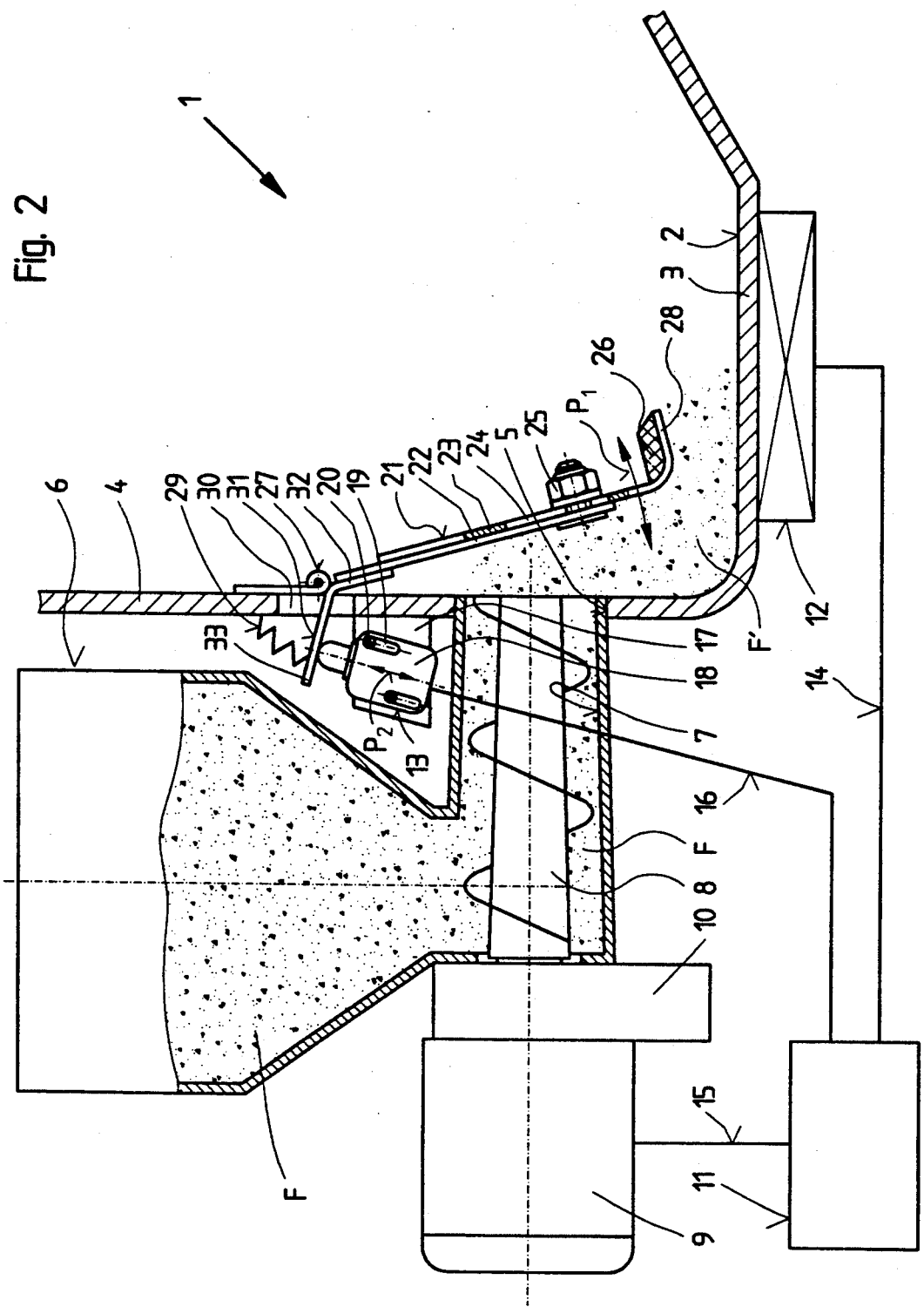

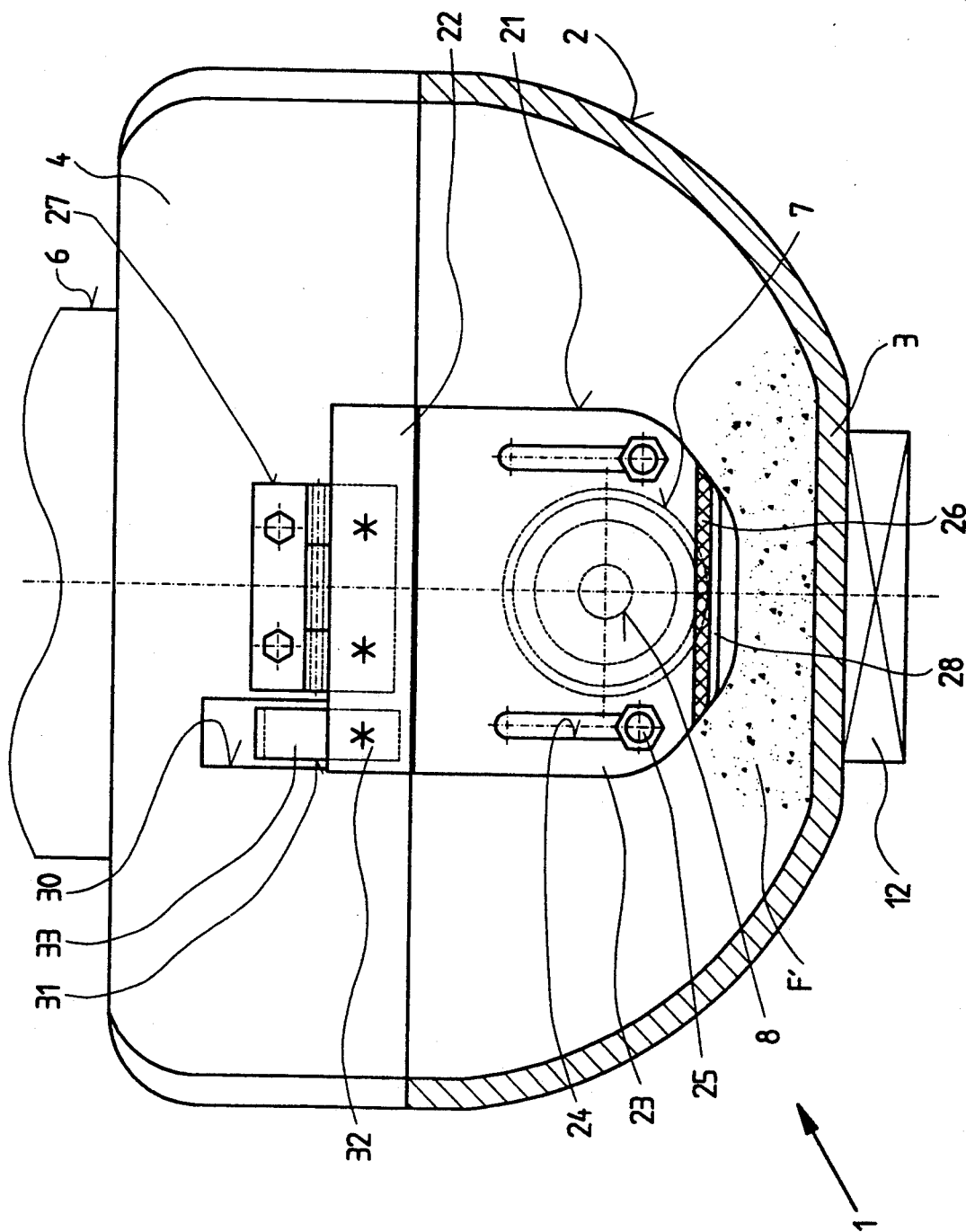

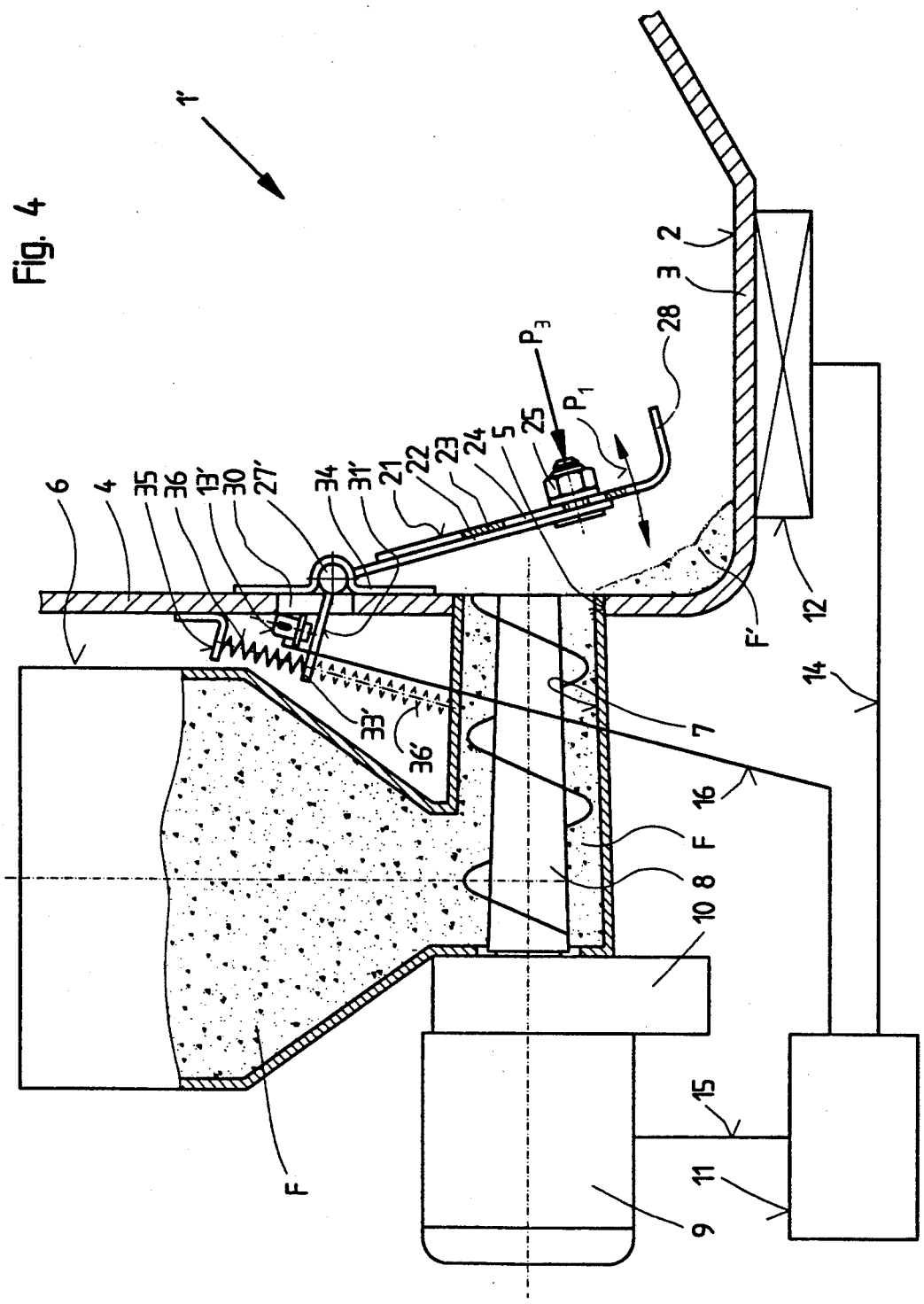

METHOD AND DEVICE FOR SUPPLYING ANIMAL FEED INTO A FEED TROUGH

BACKGROUND OF THE INVENTION

The present invention relates to a device and a method for the controlled supply of animal feed from a supply container into a feed trough with the aid of a drivable conveying device having a drive unit that is switchable by a control unit From the European published document 00 29 278 a feeding device of the aforementioned kind is known. At the worm conveyor which is serving as the dosage device a container is provided downstream in the conveying direction into which the animal feed is filled from the supply container. Since the receptacle is fixedly connected to the worm conveyor it is therefore rotated with the worm conveyor so that animal feed collected therein is emptied into a housing serving as a feed trough into which the animal inserts its head for receiving feed. The dosage device, i.e. the worm conveyor, is controllable by signals which are generated by the presence of the animal head within the opening of the housing, respectively, feed trough As soon as an animal extends its head int the housing a predetermined amount of animal feed in response to the identification number of the animal is removed from the supply container and conveyed via the worm conveyor and the rotating receptacle (whose only purpose is to prevent feed from falling into the housing when the worm conveyor is not moving) into the feed trough. However, when an animal which initiated the distribution of animal feed does not completely consume the allotted amount of feed, excess animal food remains within the housing (feed trough) so that other animals approaching the feeding device can eat an uncontrollable amount of animal feed. It also happens that due to the uncontrollable feed consumption of the animals after a short period of time a large amount of excess feed collects within the housing (feed trough) so that the housing, respectively, the feed trough is completely filled and excess feed falls to the floor. A complete emptying of the housing by consumption through an animal thus occurs only randomly. Furthermore, remaining animal feed within the housing can become soiled and is then no longer consumed by the animals so that an exact allotment of animal feed for a specific animal is impossible with the known feeding device.

It is therefore an object of the present invention to provide a device of the aforementioned kind for the controlled supply of animal feed from a supply container into a feed trough as well as a method for the use of the aforedescribed device with which it is possible to provide a predetermined amount of animal feed to a specific animal whereby it is however ensured that each animal only receives the exact predetermined amount of feed. Furthermore, it should be ensured that the feed trough is always emptied by a respective animal because a further feed supply is only possible when the feed trough has been emptied so that each individual animal can consume animal feed under the same conditions and a collection of excess animal feed in the trough or an uneven distribution between animals is prevented. Furthermore it is a desirable feature that the animals be able to initiate the feed distribution. The required constructive expenditure should be minimal; however, only the maximum allowable amount of animal feed should be supplied to a specific animal. Furthermore, spoilage of animal feed should be prevented and the manipulation of the feeding process should be facilitated.

BRIEF DESCRIPTION OF THE DRAWINGS

This object, and other objects and advantages of the present invention, will appear more clearly from the following specification in conjunction with the accompanying drawings, in which:

FIG. 1 shows a feeding device before start-up in a side view;

FIG. 2 shows a device according to FIG. 1 in a first operational position in which the conveying device has been shut off by the amount of animal feed present within the feed trough;

FIG. 3 shows a device according to FIG. 2 in an end view; and

FIG. 4 shows the device of FIG. 2 with a different actuating mechanism for the control element.

SUMMARY OF THE INVENTION

The inventive device for the controlled supply of animal feed is primarily characterized by:

A supply container;

A feed trough with a side wall having an inlet;

A conveying device with a drive unit connected between the supply container and the inlet of the feed trough, the conveying device having an outlet opening that is coaxially arranged relative to the axis of the conveying device, the outlet opening being directly connected to the inlet of the feed trough;

A control unit connected to the drive unit for switching on and off the drive unit;

A control flap pivotably connected to the inlet, the control flap including a control element connected to the control unit; and The control flap activating the control unit for switching on and off the drive unit depending on an amount of animal feed present in the feed trough behind the control flap or due to activation by an animal.

The device preferably further comprises a hinge means for pivotably connecting the control flap to the side wall above the inlet. The control flap expediently further comprises a switch lever connected to the signal sender, the control element preferably being in the form of a signal sender. In a further embodiment of the present invention, the control flap further comprises an intermediate member connected between the switch lever and the control element Preferably, the side wall of the feed trough has an opening, whereby the switch lever extends through the opening and the control element is connected to the outer oriented surface of the side wall. Preferably, the control element is connected within a pivoting range of the switch lever. It is also possible that the switch lever extends laterally along the side wall, with the control element connected to the outer surface of the side wall and within a pivoting range of the switch lever.

The control element is expediently adjustable relative to the switch lever. The control element comprises a housing and a support, whereby the support is connected to the feed trough and the housing is connected to the support. The housing has slotted holes with screws extending through the slotted holes for connecting the housing to the support.

Preferably the control flap has a bottom portion and a weight connected to the bottom portion. The bottom portion preferably has a projection extending into the feed trough and the weight is attached to the projection. Preferably, this projection is angularly shaped. In an alternative, the projection is a separate member connected to the control flap and adjustable in the vertical direction of the control flap. Preferably, the projection, i.e., the separate member is exchangeable. It is also possible that the separate member forms the weight. Alternatively, the weight is connected to the separate member.

The device further comprises a spring connected to the control flap for returning the control flap into an initial closed position. Expediently the spring may be connected to the switch lever for returning the control flap into the initial closed position. A spring may also be connected to the control flap for adjusting the control element against the force of the spring. Preferably, the spring is connected between a leg of the switch lever acting on the control element and the side wall of the feed trough. An intermediate plate may be connected to the side wall, the spring being attached to the intermediate plate. In another embodiment of the present invention the device further comprises an antenna for receiving signals emitted by animals to be fed, whereby the control unit is controlled by the signals received by the antenna.

The inventive method for the controlled supply of animal feed fed from a supply container into a feed trough via a drivable conveying device having a drive unit that is switchable by a control unit includes the following step:

Actuating a control element that is connected to the control unit by a control flap pivotably connected to an inlet of the feed trough such that the drive unit remains switched off depending on the amount of animal feed present in the feed trough until the rationed amount of animal feed has been consumed Expediently, the inventive method further comprises the step of switching on the drive unit by activation through an animal to be fed and maintaining the drive unit in the switched-on state until the rationed amount of animal feed has been supplied to the feed trough.

The inventive method may further comprise the step of controlling the control unit by signals emitted by the animals to be fed and received by an antenna connected to the control unit.

In an alternative of the inventive method for the controlled supply of animal feed from a supply container into a feed trough via a drivable conveying device having a drive unit that is switchable by a control unit the drive unit is switched on by activation through an animal to be fed and maintaining the drive unit in the switched-on state until the rationed amount of animal feed has been supplied to the feed trough. Preferably this alternative method further comprises the step of controlling the control unit by signals emitted by the animals to be fed and received by an antenna connected to the control unit.

When a device for the controlled supply of animal feed from a supply container into a feed trough according to the present invention is provided it is reliably ensured that the individual animals to be fed only receive the exact predetermined amount of animal feed allotted to them. When a control flap is pivotably connected at the outlet opening of the conveying device, respectively, the inlet of the feed trough with which the conveying device may be switched off as a function of the amount of animal feed present within the feed trough, it is prevented in a simple manner that excess animal feed collects within the feed trough and can consumed by other animals. The amount of animal feed to be consumed by a specific animal is thus limited to the exact amount predetermined for the animal and memorized in connection with its identification number.

With the control flap cooperating with a control element the amount of animal feed to be conveyed into the feed trough is thus exactly controllable with very simple means. When after initiation of a feed supply process (also possible through activation by an animal when the feed trough is empty by actuating, i.e., pushing the control flap so that the drive unit of the conveying device is switched on), animal feed has collected within the feed trough to a certain predetermined amount, because, for example, an animal consumes feed only slowly or does not eat at all, the control flap in this case is pivoted away from the conveying device by the feed and the respective switch lever connected thereto acts on the control element which then switches off the drive unit of the conveying device. The conveying device can only be turned on again when the retaining amount of animal feed within the feed trough has been consumed because only then the control flap is automatically or by the force of a spring returned into its initial closed position in which the control element is not actuated or activated. A collection of animal feed within the feed trough which could be consumed by other than the eligible animals is therefore prevented. When employing the inventive device, respectively, the inventive method an exact distribution of individual animal feed rations to the respective animal is thus possible in a simple manner.

DESCRIPTION OF PREFERRED EMBODIMENTS

The present invention will now be described in detail with the aid of several specific embodiments utilizing FIGS. 1 through 4.

The device 1, 1' represented in FIGS. 1 to 4 serves to supply animal feed to animals and is comprised essentially of a tub-shaped feed trough 2 and a supply container 6 from which the animal feed supply F is introduced into the feed trough 2 via the worm conveyor 8. A drive unit 9 is provided for driving the worm conveyor 8 which is in a driving connection with gears 10.

In order to initiate a feed distribution to the feed trough 2 the underside of the bottom 3 of the feed trough 2 is provided with an antenna 12 which is connected via a signal line 14 to a control unit 11. The control unit 11, on the other hand, is connected via a signal line 15 to the drive unit 9 of the worm conveyor 8. When an animal provided with an identification tag, commonly provided at the collar, approaches the antenna 12, signals received by the antenna 12 are sent to the control unit 11 and processed by a computing unit. The drive unit 9 of the worm conveyor 8 is then activated for a certain period of time corresponding to the received signal so that the animal receives a predetermined amount of animal feed in the feed trough 2.

However, since animals sometimes do not completely consume the allotted amount of feed and other animals could therefore consume an uncontrolled amount of feed, the device 1 is provided with measures to prevent this. According to these measures, animal feed should only be supplied to the feed trough 2 when the previously distributed animal feed has been consumed by the identified animal with the exception of a minimal predetermined rest.

In order to achieve this, a control flap 21 is connected to the inlet 5 of the side wall 4 of the feed trough 2 which is directly connected to the outlet opening 5 of the conveying channel 7 that contains the worm gear 8. The control flap 21 is pivotably connected to the side wall 4 above the inlet 5 by a hinge 27. The control flap 21 is further provided with a switch lever 31 which extends through an opening 30 in the side wall 4 and which cooperates with a control element 13. Via a signal line 16 the control element 13 is connected to the control unit 11.

When the control element 13 is activated, as represented in FIG. 2, the drive unit 9 of the worm conveyor 8 is shut off via the control unit 11 so that no more animal feed F is conveyed into the feed trough 2. This operational stage can occur when the amount of feed F' conveyed into the feed trough 2 has not been or not completely been consumed by the respective animal so that it collects within the feed trough 2 and thereby pivots the control flap 21 which in return activates the control element 13 via the switch lever 31.

The control element 13 is connected with a holder 17 to the outer surface of the side wall 4 within the pivoting range of the switch lever 31. In order to be able to compensate for dimensional tolerances, the housing 18 of the control element 13 is provided with slotted holes 19 through which screws 20 extend. The control element 13 is thus adjustable in the direction of the switch lever 31, as is indicated by arrow $P_2$.

The control flap 21 is comprised of a plate 22 connected to a hinge 27 and has also a separate member 23 which is connected to the bottom portion of the plate 22 by screws 25. The separate member 23 has slotted holes 24 so that the separate member 23 is adjustable in the longitudinal direction. Furthermore, the separate member 23 is provided with an angular portion 28 extending into the interior of the feed trough 2. The angular projection 28 has connected thereto a weight 26. The return of the control flap 21 into its initial closed position is thus automatically achieved by gravity and can be affected by the length of the control flap 21 and/or by the weight 26.

The switch lever 31 is comprised of two legs 32 and 33. The leg 32 is welded to the plate 22 of the control flap 21 and the leg 33 extends through the opening 30 of the sidewall 4 and acts on the control element 13.

The control flap 21 can also be returned into its initial closed position by a tension spring 29. The tension spring 29 in this embodiment is connected to the leg 33 of the switch lever 31 acting on the control element 13 and to the side wall 4 of the feed trough 2. The tension spring 29 can be employed in addition to the weight 26 or instead of the weight 26.

For a preset amount of animal feed F' in the feed trough 2 the control element 13 is activated due to the pivoting of the control flap 21 in the direction of arrow $P_1$ initiated by the amount of animal feed F'. The control element 13 is connected via the signal line 16 to the control unit 11. As long as the leg 32 of the switch lever 31 acts on the control element 13 the drive unit 9 is turned off. Animal feed F can thus only be conveyed via the worm conveyor 8 into the feed trough 2 when the animal feed F' has almost been completely consumed by the animal. In this manner, it is reliably prevented that one animal can consume more feed than its allotted amount.

In the device 1' according to FIG. 4 it is provided that the animal feed F is conveyed into the feed trough 2 from the supply container 6 upon activation by the animal. In order to be able to achieve this in a simple manner a pressure spring 36 acts on the leg 33' of the switch lever 31, the spring 36 being supported at an intermediate plate 35 connected to the side wall 4. Instead of the pressure spring 36 it is also possible, as indicated in a dash-dotted line, to provide a tension spring 36' connected to the conveying channel 7.

When the control flap 21 is pivoted by an animal in the direction of arrow $P_3$ at a time when the feed trough 2 is empty or almost empty, the leg 33' of the switch lever 31 is pressed against the force of the spring 36 or 36' against the control element 13' and via the signal line 16 the control unit 11 is activated. Since it has been determined via the antenna 12 which animal is requesting animal feed a respective amount of feed F' can be allotted to this animal since the control unit 11 has memorized respective data. The drive unit 9 of the worm conveyor 8 is thus switched on through activation by the animal for a certain period of time.

The control flap 21 in this embodiment is connected in a pivotable manner by a joint 27', fastened by clamps S4 to the side wall 4 above the inlet 5. The attachment of a weight to the control flap 21 is obsolete since as soon as the animal acts on the control flap 21 the control flap 21 is pivoted into the shown initial position due to the force of the spring 36 or 36', and the leg 33' of the switch lever 31 is thus removed from the control element 13'. However, when the feed trough 2 still contains a greater amount of animal feed F', the control flap 21 cannot be pivoted by the animal and thus the control element 13' cannot be actuated.

The present invention is, of course, in no way restricted to the specific disclosure of the specification and drawings, but also encompasses any modifications within the scope of the appended claims.

What I claim is:

1. A device for the controlled supply of animal feed, said device comprising:
   a supply container;
   a feed trough with a side wall having an inlet;
   a conveying device with a drive unit connected between said supply container and said inlet of said feed trough, said conveying device having an outlet opening that is coaxially arranged relative to the axis of said conveying device, said outlet opening directly connected to said inlet of said feed trough;
   a control unit connected to said drive unit for switching on and off said drive unit;
   a control flap pivotably connected in front of said inlet, said control flap including a control element connected to said control unit and a switch lever connected to said control element;
   a spring connected to said switch lever for returning said control flap into an initial closed position; and
   said control flap activating said control unit for switching on and off said drive unit depending on an amount of animal feed present in said feed trough behind said control flap.

2. A device according to claim 1, further comprising a hinge means for pivotably connecting said control flap to said side wall above said inlet.

3. A device according to claim 1, wherein said control element is in the form of a signal sender.

4. A device according to claim 3, wherein said control flap further comprises an intermediate member connected between said switch lever and said control element.

5. A device according to claim 3, wherein said side wall has an opening, with said switch lever extending through said opening and with said control element connected to the outer surface of said side wall.

6. A device according to claim 5, wherein said control element is connected within a pivoting range of said switch lever.

7. A device according to claim 3, wherein said switch lever extends laterally along said side wall and wherein said control element is connected to the outer surface of said side wall.

8. A device according to claim 7, wherein said control element is connected within a pivoting range of said switch lever.

9. A device according to claim 3, wherein said control element is adjustable relative to said switch lever.

10. A device according to claim 9, wherein said control element comprises a housing and a support, said support connected to said feed trough and said housing connected to said support, said housing having slotted holes with screws extending therethrough for connecting said housing to said support.

11. A device according to claim 1, wherein said spring is connected between a leg of said switch lever and said side wall of said feed trough, said leg acting on said control element.

12. A device according to claim 11, further including an intermediate plate connected to said side wall and to which said spring is attached.

13. A device according to claim 1, wherein said control flap has a bottom portion and a weight connected to said bottom portion.

14. A device according to claim 13, wherein said bottom portion has a projection extending into said feed trough, said weight attached to said projection.

15. A device according to claim 14, wherein said projection is angularly shaped.

16. A device according to claim 14, wherein said projection is a separate member connected to said control flap and adjustable in the vertical direction of said control flap.

17. A device according to claim 16, wherein said separate member is exchangeable.

18. A device according to claim 16, wherein said separate member forms said weight.

19. A device according to claim 16, wherein said weight is connected to said separate member.

20. A device according to claim 1, further comprising an antenna for receiving signals emitted by an animal to be fed, with said control unit being controlled by the signals received by said antenna.

21. A device for the controlled supply of animal feed, said device comprising:
    a supply container;
    a feed trough with a side wall having an inlet;
    a conveying device with a drive unit connected between said supply container and said inlet of said feed trough, said conveying device having an outlet opening that is coaxially arranged relative to the axis of said conveying device, said outlet opening directly connected to said inlet of said feed trough;
    a control unit connected to said drive unit for switching on and off said drive unit;
    a control flap pivotably connected in front of said inlet, said control flap including a control element connected to said control unit; and
    said control flap activating said control unit for switching on and off said drive unit due to activation by an animal.

22. A device according to claim 21, further comprising a spring connected to said control flap for actuating said control element against the force of said spring.

23. A device according to claim 22, wherein said spring is connected between a leg of said switch lever and said side wall of said feed trough, said leg acting on said control element.

24. A device according to claim 23, further including an intermediate plate connected to said side wall and to which said spring is attached.

25. A device according to claim 21, further comprising a hinge means for pivotably connecting said control flap to said side wall above said inlet.

26. A device according to claim 21, wherein said control flap further comprises a switch lever connected to said control element and wherein said control element is in the form of a signal sender.

27. A device according to claim 26, wherein said control flap further comprises an intermediate member connected between said switch lever and said control element.

28. A device according to claim 26, wherein said side wall has an opening with said switch lever extending through said opening and with said control element connected to the outer surface of said side wall.

29. A device according to claim 28, wherein said control element is connected within a pivoting range of said switch lever.

30. A device according to claim 26, wherein said switch lever extends laterally along said side wall and wherein said control element is connected to the outer surface of said side wall.

31. A device according to claim 30, wherein said control element is connected within a pivoting range of said switch lever.

32. A device according to claim 26, wherein said control element is adjustable relative to said switch lever.

33. A device according to claim 32, wherein said control element comprises a housing and a support, said support connected to said feed trough and said housing connected to said support, said housing having slotted holes with screws extending therethrough for connecting said housing to said support.

34. A device according to claim 26, further comprising a spring connected to said switch lever for returning said control flap into an initial position.

35. A device according to claim 34, wherein said spring is connected between a leg of said switch lever and said side wall of said feed trough, said leg acting on said control element.

36. A device according to claim 35, further including an intermediate plate connected to said side wall and to which said spring is attached.

37. A device according to claim 21, further comprising an antenna for receiving signals emitted by an animal to be fed, with said control unit being controlled by the signals received by said antenna.

* * * * *